(12) United States Patent
Henning et al.

(10) Patent No.: US 11,615,558 B2
(45) Date of Patent: Mar. 28, 2023

(54) COMPUTER-IMPLEMENTED METHOD AND SYSTEM FOR GENERATING A VIRTUAL VEHICLE ENVIRONMENT

(71) Applicant: dSPACE digital signal processing and control engineering GmbH, Paderborn (DE)

(72) Inventors: Steffen Henning, Paderborn (DE); Thorsten Pueschl, Paderborn (DE); Matthias Thurau, Paderborn (DE)

(73) Assignee: DSPACE GMBH, Paderborn (DE)

( * ) Notice: Subject to any disclaimer, the term of this patent is extended or adjusted under 35 U.S.C. 154(b) by 283 days.

(21) Appl. No.: 17/177,231

(22) Filed: Feb. 17, 2021

(65) Prior Publication Data
US 2021/0256738 A1  Aug. 19, 2021

(30) Foreign Application Priority Data
Feb. 18, 2020  (EP) ..................... 20157831

(51) Int. Cl.
*G06T 11/00* (2006.01)
*B60W 60/00* (2020.01)
(Continued)

(52) U.S. Cl.
CPC ......... *G06T 11/00* (2013.01); *B60W 50/0205* (2013.01); *B60W 60/001* (2020.02);
(Continued)

(58) Field of Classification Search
CPC . G06T 11/00; B60W 60/001; B60W 50/0205; B60W 2420/52; B60W 2554/00;
(Continued)

(56) References Cited

U.S. PATENT DOCUMENTS

| 10,468,062 | B1* | 11/2019 | Levinson | ................ | G01S 17/89 |
| 2019/0026958 | A1* | 1/2019 | Gausebeck | ............ | H04N 13/10 |

(Continued)

FOREIGN PATENT DOCUMENTS

| CN | 205121971 U | 3/2016 |
| DE | 102019102279 A1 | 8/2019 |

(Continued)

*Primary Examiner* — Jin Cheng Wang
(74) *Attorney, Agent, or Firm* — Leydig, Voit & Mayer, Ltd.

(57) ABSTRACT

A computer-implemented method for creating a virtual vehicle environment includes: receiving data of a real vehicle environment; generating a first feature vector representing a respective real object by applying a second machine learning algorithm to the respective real object and storing the first feature vector; providing a plurality of stored second feature vectors representing synthetically generated objects; identifying a second feature vector having a greatest degree of similarity to the first feature vector; selecting the identified second feature vector and retrieving a stored synthetic object that is associated with the second feature vector and that corresponds to the real object or procedurally generating the synthetic object that corresponds to the real object, depending on the degree of similarity of the identified second feature vector to the first feature vector; and integrating the synthetic object into a predetermined virtual vehicle environment.

14 Claims, 3 Drawing Sheets

(51) Int. Cl.
*B60W 50/02* (2012.01)
*G06V 10/75* (2022.01)
*G06V 20/40* (2022.01)
*G06V 20/56* (2022.01)
*G06F 18/22* (2023.01)
*G06F 18/2431* (2023.01)

(52) U.S. Cl.
CPC .......... *G06F 18/22* (2023.01); *G06F 18/2431* (2023.01); *G06V 10/758* (2022.01); *G06V 20/41* (2022.01); *G06V 20/56* (2022.01); *B60W 2420/52* (2013.01); *B60W 2554/00* (2020.02)

(58) Field of Classification Search
CPC ... G06F 18/22; G06F 18/2431; G06V 10/758; G06V 20/41; G06V 20/56; G06V 10/774; G06V 2201/12; G06V 20/20; G06V 20/58; G06N 20/00; G06N 3/08; G06N 3/088
See application file for complete search history.

(56) References Cited

U.S. PATENT DOCUMENTS

| | | |
|---|---|---|
| 2019/0156558 A1 | 5/2019 | Neeter |
| 2019/0251397 A1 | 8/2019 | Tremblay et al. |
| 2019/0311487 A1 | 10/2019 | Xiao et al. |
| 2020/0012943 A1* | 1/2020 | Neves .................. G06N 3/0454 |
| 2020/0019785 A1* | 1/2020 | Béjeau ................. G06V 10/774 |
| 2021/0035279 A1* | 2/2021 | Hu ....................... H04N 17/002 |
| 2021/0275918 A1* | 9/2021 | Devaranjan ............ G06V 10/25 |
| 2021/0342600 A1* | 11/2021 | Westmacott ........... G06V 20/56 |

FOREIGN PATENT DOCUMENTS

| | | |
|---|---|---|
| DE | 102018222294 A1 | 6/2020 |
| EP | 3410404 A1 | 12/2018 |
| WO | WO 2018002910 A1 | 1/2018 |
| WO | WO 2019083738 A1 | 5/2019 |
| WO | WO 2019100784 A1 | 5/2019 |

* cited by examiner

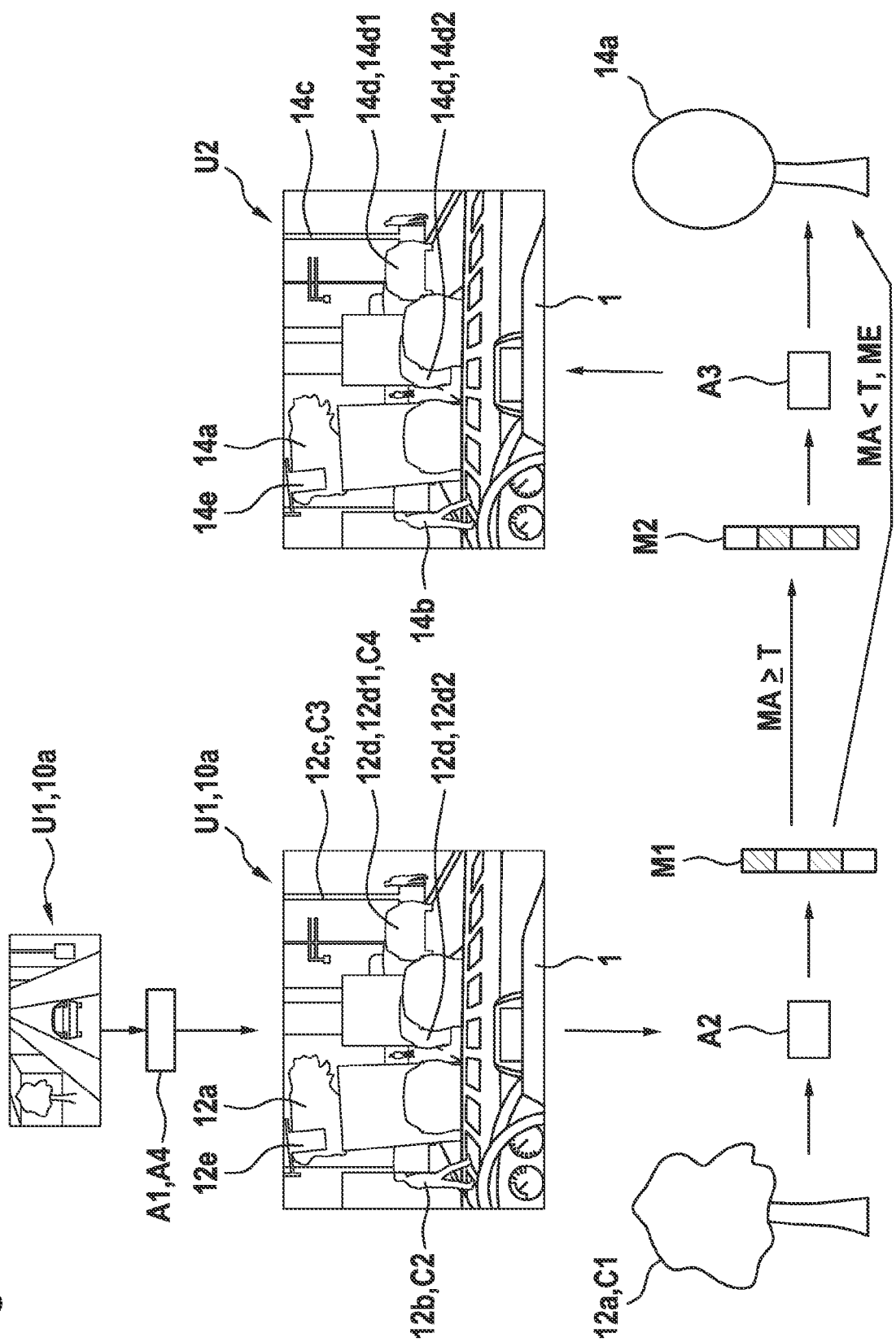

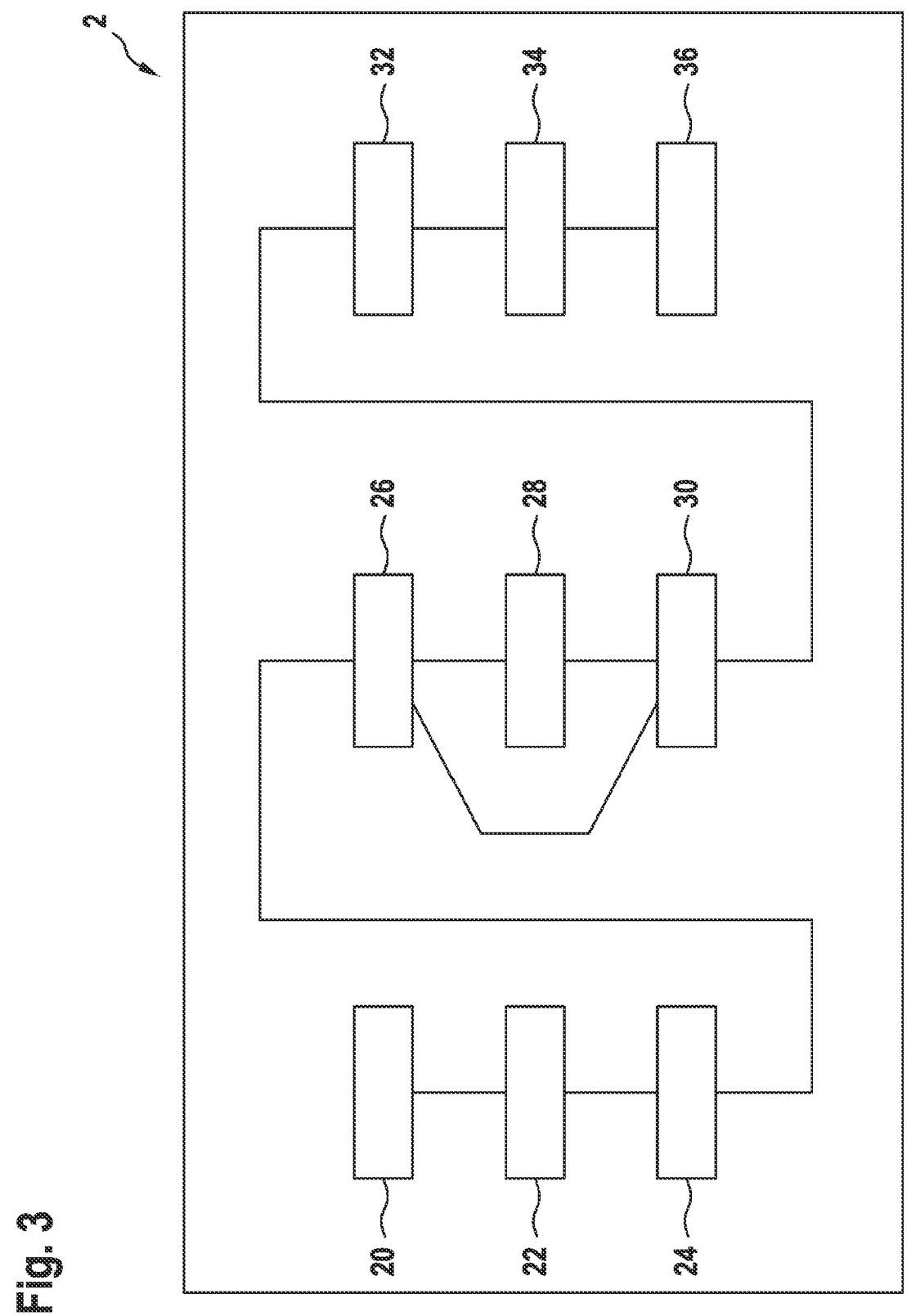

COMPUTER-IMPLEMENTED METHOD AND SYSTEM FOR GENERATING A VIRTUAL VEHICLE ENVIRONMENT

CROSS-REFERENCE TO PRIOR APPLICATIONS

Priority is claimed to European Patent Application No. EP 20157831.7, filed on Feb. 18, 2020, the entire disclosure of which is hereby incorporated by reference herein.

FIELD

The present invention relates to a computer-implemented method for creating a virtual vehicle environment for the testing of highly-automated driving functions of a motor vehicle using pre-captured video image data, radar data and/or a lidar point cloud of a real vehicle environment.

The present invention further relates to a system for creating a virtual vehicle environment for the testing of highly-automated driving functions of a motor vehicle using pre-captured video image data, radar data and/or a lidar point cloud of a real vehicle environment.

In addition, the present invention relates to a computer program and a computer-readable data carrier.

BACKGROUND

Graphical user interfaces for testing highly-automated driving functions of a motor vehicle typically have a plurality of components which allow for parameter set management, generation of a virtual vehicle environment, and experiment management.

The setting up of a scene of the virtual vehicle environment; i.e., the definition of static and dynamic objects, is accomplished through manual configuration and import of objects stored in an object library.

CN 000205121971 U discloses a method for testing autonomous vehicles. In accordance with the method, an autonomous vehicle is created in a simulation environment. In the simulation environment, a traffic environment is set up based on previously recorded status information of a virtual vehicle to enable the autonomous vehicle to drive in the traffic environment.

However, the aforementioned methods have in common that considerable complexity is required to generate the virtual vehicle environment for testing the highly-automated driving functions of the motor vehicle, which results in significant expenditures of manpower and money.

SUMMARY

In an exemplary embodiment, the present invention provides a computer-implemented method for creating a virtual vehicle environment for testing automated driving functions of a motor vehicle using pre-captured video image data, radar data and/or a lidar point cloud of a real vehicle environment. The method includes: receiving the pre-captured video image data, the radar data and/or the lidar point cloud of the real vehicle environment, wherein the pre-captured video image data, the radar data and/or the lidar point cloud of the real vehicle environment includes a plurality of real objects which are previously labeled or subsequently labeled by applying at least a first machine learning algorithm; generating a first feature vector representing a respective real object by applying a second machine learning algorithm to the respective real object and storing the first feature vector; providing a plurality of stored second feature vectors representing synthetically generated objects; identifying a second feature vector having a greatest degree of similarity to the first feature vector; selecting the identified second feature vector and retrieving a stored synthetic object that is associated with the second feature vector and that corresponds to the real object or procedurally generating the synthetic object that corresponds to the real object, depending on the degree of similarity of the identified second feature vector to the first feature vector; and integrating the synthetic object into a predetermined virtual vehicle environment.

BRIEF DESCRIPTION OF THE DRAWINGS

For a better understanding of the present invention and advantages thereof, reference is now made to the following description in conjunction with the accompanying drawings The invention will be explained in more detail below with reference to exemplary embodiments illustrated in the schematic figures of the drawings, in which:

FIG. 2 is a schematic diagram illustrating the application of the method to a real vehicle environment to generate the virtual vehicle environment according to the preferred embodiment of the invention;

FIG. 3 is a diagram of a system for creating the virtual vehicle environment for the testing of highly-automated driving functions of the motor vehicle according to the preferred embodiment of the invention.

DETAILED DESCRIPTION

Figure 1:
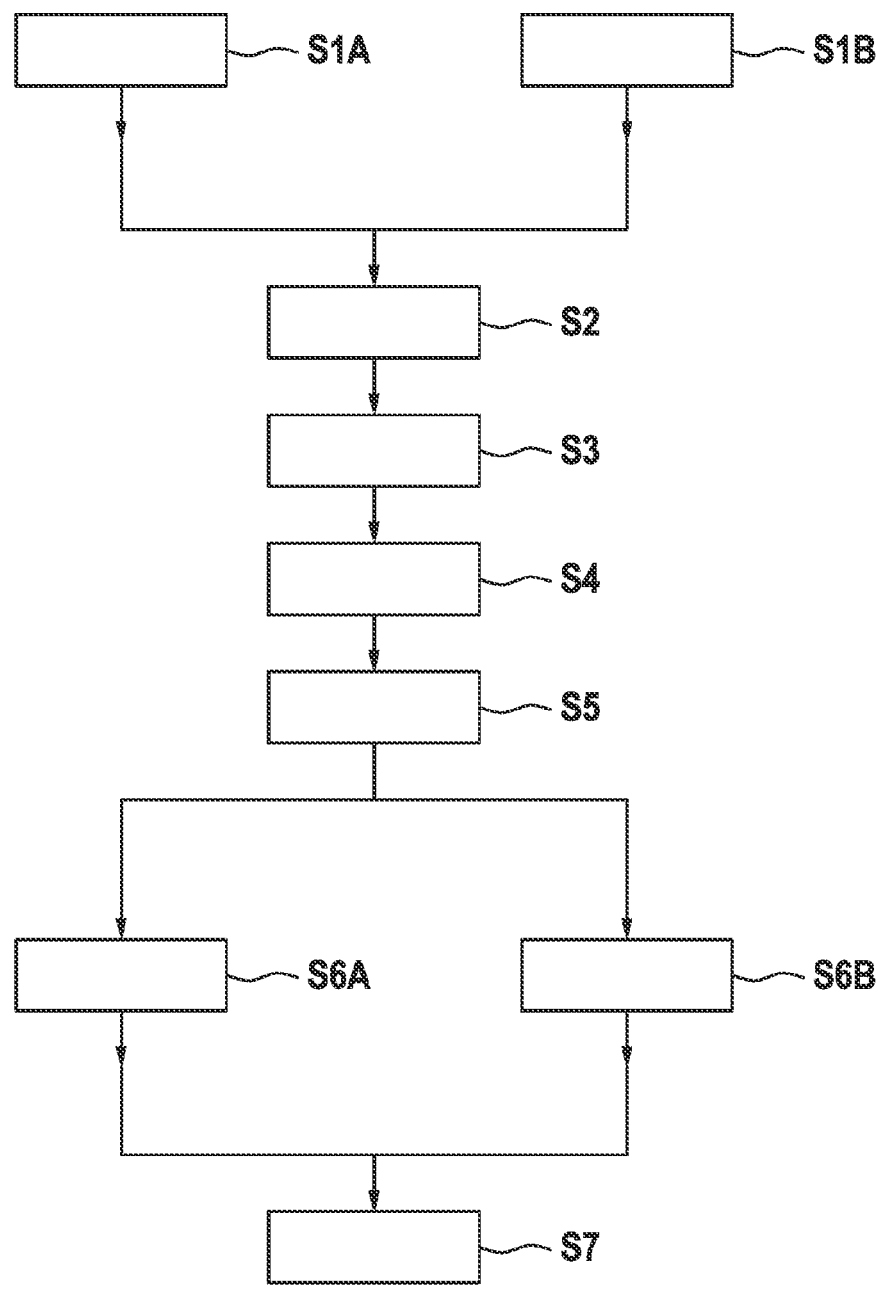
FIG. 1 is a flowchart of a method for creating a virtual vehicle environment for the testing of highly-automated driving functions of a motor vehicle according to a preferred embodiment of the invention.

Exemplary embodiments of the present invention provide for creating a virtual vehicle environment for the testing of highly-automated driving functions of a motor vehicle in such a way that they allow the virtual vehicle environment to be generated in a simplified, more efficient, and less expensive manner.

Exemplary embodiments of the present invention provide a computer-implemented method, a system, a computer program, and a computer-readable data carrier which allow for simplified, more efficient, and less expensive generation of a virtual vehicle environment for the testing of highly-automated driving functions of a motor vehicle.

Exemplary embodiments of the present invention provide a computer-implemented method for creating a virtual vehicle environment for the testing of highly-automated driving functions of a motor vehicle using pre-captured video image data, radar data and/or a lidar point cloud of a real vehicle environment, a system for creating a virtual vehicle environment for the testing of highly-automated driving functions of a motor vehicle using pre-captured video image data, radar data and/or a lidar point cloud of a real vehicle environment, a computer program, and a computer-readable data carrier.

In an exemplary embodiment, the present invention provides a computer-implemented method for creating a virtual vehicle environment for the testing of highly-automated driving functions of a motor vehicle using pre-captured video image data, radar data and/or a lidar point cloud of a real vehicle environment.

The method includes receiving the pre-captured video image data, radar data and/or the lidar point cloud of the real vehicle environment including a plurality of real objects which are previously labeled or subsequently labeled by applying at least a first machine learning algorithm.

The real vehicle environment corresponds to a surrounding environment of the motor vehicle in road traffic, particularly in a plurality of road traffic situations. The real objects may be static objects, such as traffic signs, buildings, plants, and/or parked motor vehicles. Furthermore, the real objects may be dynamic objects, such as moving motor vehicles.

The method further includes generating a first feature vector representing a respective real object by applying a second machine learning algorithm to the respective real object and storing the first feature vector.

Moreover, the method includes providing a plurality of stored second feature vectors representing synthetically generated objects, as well as identifying a second feature vector having a greatest degree of similarity to the first feature vector.

The degree of similarity may be defined based on predetermined properties of the first feature vector and the second feature vector.

The synthetically generated objects are classified into different object categories and represent the objects labeled in the video image data, radar data and/or the lidar point cloud of the real vehicle environment.

The method further includes selecting the identified second feature vector and retrieving a stored synthetic object that is associated with the second feature vector and corresponds to the real object or procedurally generating the synthetic object that corresponds to the real object, depending on the identified degree of similarity, as well as integrating the synthetic object into a predetermined virtual vehicle environment.

The virtual vehicle environment is a computer-generated representation of the real vehicle environment captured by a sensor system.

"Procedural generation" refers to a method for generating 3-D objects even in real-time during the execution of the computer program.

In this process, the 3-D objects are not generated randomly, but based on deterministic algorithms to be able to repeatedly generate the same contents for the same initial conditions.

The invention also relates to a system for creating a virtual vehicle environment for the testing of highly-automated driving functions of a motor vehicle using pre-captured video image data, radar data and/or a lidar point cloud of a real vehicle environment. The system includes a component for receiving the pre-captured video image data, radar data and/or the lidar point cloud of the real vehicle environment including a plurality of real objects which are previously labeled or subsequently labeled by applying at least a first machine learning algorithm.

The system further includes a component for applying at least a first machine learning algorithm to the video image data, radar data and/or the lidar point cloud to detect and classify the plurality of real objects, as well as a component for generating a first feature vector representing a respective real object, which component is adapted to apply a second machine learning algorithm to the respective real object, and a component for storing the first feature vector.

Furthermore, the system includes a component for providing a plurality of stored second feature vectors representing synthetically generated objects, as well as a component for identifying a second feature vector having a greatest degree of similarity to the first feature vector.

In addition, the system includes a component for selecting the identified second feature vector and retrieving a stored synthetic object that is associated with the second feature vector and corresponds to the real object, and a component for procedurally generating the synthetic object that corresponds to the real object, the component for selecting the identified second feature vector and retrieving a stored synthetic object which is associated with the second feature vector or the component for procedurally generating the synthetic object that corresponds to the real object being used depending on the identified feature vector.

The system also includes a component for integrating the synthetic object into a predetermined virtual vehicle environment.

The invention further relates to a computer program having program code for carrying out an exemplary embodiment of the inventive method when the computer program is executed on a computer.

In addition, the invention relates to a computer-readable data carrier containing program code of a computer program for carrying out an exemplary embodiment of the inventive method when the computer program is executed on a computer.

In an exemplary embodiment, the present invention automatically sets up a synthetic 3-D scene from real video image data of a measurement drive of a motor vehicle.

The generation of a first feature vector representing a respective real object by applying a machine learning algorithm to the respective real object advantageously eliminates the need to perform direct object classification and association with a synthetic object.

In the case of direct object classification, the respective objects would have to be classified by an artificial neural network. This would require expensive and time-consuming training of the artificial neural network using a large set of training data.

Instead of this, the present invention allows for using existing data of typical traffic scene objects archived or stored in a database. This allows for easy association of the second feature vector with a corresponding synthetic object.

Thus, by comparison of the first feature vectors that represent corresponding real objects to existing second feature vectors that represent synthetically generated objects, it is advantageously possible to automatically associate corresponding real and synthetically generated objects with one another, so that the synthetically generated objects identified in this way can then be integrated into the virtual vehicle environment.

Thus, by automating the setting up of a scene of the virtual vehicle environment using the data obtained from the real vehicle environment, it is advantageously possible to significantly simplify the setting up of a scene of the virtual vehicle environment, while at the same time achieving a substantial increase in efficiency and an associated reduction in costs.

In accordance with an aspect of the invention, the method further includes that the labeling, in particular the detection and classification, of the plurality of real objects is performed by a supervised learning algorithm or by an unsupervised learning algorithm, in particular an artificial neural network.

This advantageously makes it possible to use an algorithm that is suitable based on a data type and/or other systemic parameters.

In accordance with a further aspect of the invention, the method further includes that if the degree of similarity of the identified second feature vector to the first feature vector is greater than or equal to a predetermined threshold, selecting the identified second feature vector and retrieving the stored synthetic object that is associated with the second feature vector and corresponds to the real object.

Thus, it is advantageously possible to allow retrieving of a synthetic object that has a high degree of similarity to the selected real object.

In accordance with another aspect of the invention, the method further includes that if the degree of similarity of the identified second feature vector to the first feature vector is less than a predetermined threshold, procedurally generating the synthetic object.

Advantageously, even if there is not sufficient agreement between the first feature vector corresponding to the real object and one of the second feature vectors corresponding to the plurality of synthetically generated objects, a synthetic object corresponding to the real object can still be generated by procedurally generating the synthetic object.

In accordance with a further aspect of the invention, the method further includes the step of performing the procedural generation of the synthetic object using the first feature vector generated by the second machine learning algorithm.

Thus, it is advantageously possible to ensure that the synthetic object generated in this way will largely match the underlying real object.

In accordance with another aspect of the invention, the method further includes that the second machine learning algorithm for generating, in particular encoding, the first feature vector is formed by a first variational autoencoder. The variational autoencoder has the advantage of being able to generate a dimension-reduced or a complexity-reduced representation of the underlying real data.

In accordance with a further aspect of the invention, the method further includes that the second feature vector representing a respective synthetic object is generated by applying a third machine learning algorithm to the respective synthetic object, the second feature vector being stored in a data store.

This makes it possible to associate the first and second feature vectors with each other; i.e., to compare the features thereof, and thus to associate the real objects with synthetic objects.

In accordance with an additional aspect of the invention, the method further includes that the real objects contained in the video image data, radar data and/or the lidar point cloud are classified into main classes by the first machine learning algorithm, the real objects assigned to a main class being classified into sub-classes by applying a fourth machine learning algorithm.

Thus, it is advantageously possible to classify the objects contained in the real data in a step-by-step process. In a first step, the real objects are coarsely classified into main classes. In a second step, the respective real objects assigned to the main classes are classified to a greater level of detail into corresponding sub-classes.

In accordance with a further aspect of the invention, the method further includes that if the first feature vector and the second feature vector are similar, in particular have the same data structure, performing a direct comparison between the first feature vector and the plurality of second feature vectors to identify the degree of similarity.

Thus, it is advantageously possible to enable efficient identification of a suitable second feature vector or comparison of the first feature vectors to the second feature vectors without further intermediate steps.

In accordance with another aspect of the invention, the method further includes that if the first feature vector and the second feature vector are dissimilar, in particular have different data structures, identifying the degree of similarity of the second feature vector to the first feature vector by using a classifier that establishes a correlation between the first feature vector and the second feature vector.

Thus, even when using dissimilar feature vectors such as differently encoded feature vectors, it is advantageously possible to establish a correlation between the different feature vectors, and thus to associate respective first feature vectors with respective second feature vectors.

In accordance with an additional aspect of the invention, the method further includes that the plurality of stored first feature vectors and/or second feature vectors represent 2-D image data, 3-D image data, radar data and/or a lidar point cloud.

Thus, the source data underlying the second feature vectors may advantageously be of different kinds, so that a plurality of different source data acquired in reality can be used and correlated or associated with synthetically generated objects or object data.

In accordance with another aspect of the invention, the method further includes that if the degree of similarity of the identified second feature vector to the first feature vector is less than the predetermined threshold, generating a message that the stored plurality of second feature vectors do not have a sufficient degree of similarity to the identified first feature vector.

Thus, the user is advantageously informed of this fact and thus can, for example, expand a data store which stores the synthetically generated objects underlying the second feature vectors.

The method features described herein are also applicable to other virtual environments such as, for example, the testing of other types of vehicles in different environments.

In the drawings, like reference numerals designate like elements of the drawings, unless otherwise indicated.

FIG. 1 shows a flowchart of a method for creating a virtual vehicle environment for the testing of highly-automated driving functions of a motor vehicle according to a preferred embodiment of the invention.

The method includes receiving S1A, S1B the pre-captured video image data 10a, radar data and/or the lidar point cloud of the real vehicle environment U1 including a plurality of real objects 12a, 12b, 12c, 12d, 12e which are previously labeled S1A or subsequently labeled S1B by applying at least a first machine learning algorithm A1.

The method further includes generating S2 a first feature vector M1 representing a respective real object 12a, 12b, 12c, 12d, 12e by applying a second machine learning algorithm A2 to the respective real object 12a, 12b, 12c, 12d, 12e and storing S3 the first feature vector M1.

Moreover, the method includes providing S4 a plurality of stored second feature vectors M2 representing synthetically generated objects 14a, 14b, 14c, 14d, 14e, as well as identifying S5 a second feature vector M2 having a greatest degree of similarity MA to the first feature vector M1.

The method further includes selecting S6A the identified second feature vector M2 for generating a synthetic object 14a, 14b, 14c, 14d, 14e that corresponds to the real object 12a, 12b, 12c, 12d, 12e.

Alternatively, the synthetic object 14a, 14b, 14c, 14d that corresponds to the real object 12a, 12b, 12c, 12d is procedurally generated S6B.

The selection of step S6A or step S6B is made based on the identified degree of similarity MA. Subsequently, the synthetic object 14a, 14b, 14c, 14d, 14e is integrated S7 into a predetermined virtual vehicle environment U2.

FIG. 2 shows a schematic diagram illustrating the application of the method to a real vehicle environment to generate the virtual vehicle environment according to the preferred embodiment of the invention.

In the exemplary embodiment illustrated here, video image data are used both in the virtual vehicle environment U2 and in the real vehicle environment U1.

Alternatively or additionally, it is possible to use, for example, radar data and/or a lidar point cloud of a real vehicle environment to generate the virtual vehicle environment.

The pre-captured video image data 10a are initially labeled by applying a first machine learning algorithm A1.

The labeling includes detecting and classifying the plurality of real objects 12a, 12b, 12c, 12d, 12e by the first machine learning algorithm A1.

In the present embodiment, the first machine learning algorithm A1 is formed by a supervised learning algorithm, in particular an artificial neural network.

Alternatively, the first machine learning algorithm A1 may be formed, for example, by an unsupervised learning algorithm, in particular an artificial neural network. The first machine learning algorithm A1 classifies the real objects 12a, 12b, 12c, 12d contained in the video image data 10a into main classes C1, C2, C3, C4.

The real objects 12a, 12b, 12c, 12d assigned to a main class C1, C2, C3, C4 are further classified into sub-classes 12d1, 12d2 by applying a fourth machine learning algorithm A4.

In the present exemplary embodiment, object 12a is a tree, object 12b is a pedestrian, object 12c is a street light, the plurality of objects 12d are different vehicles, and object 12e is a traffic sign.

Thus, the aforementioned objects correspond to the respective main classes. Sub-classes are defined by varieties of objects such as, for example, different kinds of trees and/or different kinds of pedestrians, selected by gender, age, or other classifiable characteristics.

A special case here is traffic sign 12e because, in the present exemplary embodiment, it is neither generated by associating a second feature vector with a first feature vector, nor is it procedurally generated. Rather, it is generated from other data sources or by other methods because accurate and faithful reproduction of the traffic sign information is important here.

Alternatively, if, for example, there is sufficient agreement between a first feature vector and a corresponding second feature vector, traffic signs may, for example, be generated via a synthetic object stored in a data store.

The real objects 12a, 12b, 12c, 12d present in the real vehicle environment U1 are then selected, and a first feature vector M1 representing the respective real object 12a, 12b, 12c, 12d is generated by applying the second machine learning algorithm A2 to the respective real object 12a, 12b, 12c, 12d.

This procedure is carried out for all of the objects 12a, 12b, 12c, 12d present in the real vehicle environment U1.

Furthermore, each of the so-generated first feature vectors M1, which are stored in a corresponding data store, is compared to or associated with a second feature vector M2.

For this purpose, a plurality of stored second feature vectors M2 are provided which represent synthetically generated objects 14a, 14b, 14c, 14d, and a second feature vector M2 having a greatest degree of similarity MA to the first feature vector M1 is identified.

If the degree of similarity MA of the identified second feature vector M2 to the first feature vector M1 is greater than or equal to a predetermined threshold T, the identified second feature vector M2 is selected.

Subsequent to, or because of this, a stored synthetic object 14a, 14b, 14c, 14d, 14e that is associated with the second feature vector M2 and corresponds to the real object 12a, 12b, 12c, 12d, 12e is retrieved from a data store.

Prior to, or in advance of, this, the second feature vector M2 representing a respective synthetic object 14a, 14b, 14c, 14d, 14e was generated by applying a third machine learning algorithm A3 to the respective synthetic object 14a, 14b, 14c, 14d, 14e and stored S3 in the data store.

If the degree of similarity MA of the identified second feature vector M2 to the first feature vector M1 is less than the predetermined threshold T, the synthetic object 14a, 14b, 14c, 14d is procedurally generated.

The procedural generation may be accomplished using, for example, a software application which is suitable for this purpose, such as, for example, Unreal Engine. The procedural generation of the synthetic object 14a, 14b, 14c, 14d, 14e is performed using the first feature vector M1 generated by the second machine learning algorithm A2.

In the present embodiment, the second machine learning algorithm A2 for generating, in particular encoding, the first feature vector M1 is formed by a first variational autoencoder.

In the present embodiment, the object 14e constituted by a traffic sign is generated from the traffic sign 12e present in the real vehicle environment U1 using another suitable method.

As illustrated in the present embodiment, if the first feature vector M1 and the second feature vector M2 are similar, in particular have the same data structure, a direct comparison between the first feature vector M1 and the plurality of second feature vectors M2 is performed to identify the degree of similarity MA.

If the first feature vector M1 and the second feature vector M2 are dissimilar, in particular have different data structures, the degree of similarity MA of the second feature vector M2 to the first feature vector M1 may alternatively be identified using a classifier that establishes a correlation between the first feature vector M1 and the second feature vector M2.

In the present embodiment, the plurality of stored first feature vectors M1 and second feature vectors M2 are formed by 3-D image data.

Alternatively, the first feature vectors M1 and the second feature vectors M2 may be represented by 2-D image data, radar data and/or a lidar point cloud.

Further, in accordance with the present embodiment, if the degree of similarity MA of the identified second feature vector M2 to the first feature vector M1 is less than the predetermined threshold T, a message ME is generated that the stored plurality of second feature vectors M2 do not have a sufficient degree of similarity MA to the identified first feature vector M1.

FIG. 3 shows a diagram of a system for creating the virtual vehicle environment for the testing of highly-automated driving functions of the motor vehicle according to the preferred embodiment of the invention.

System 2 includes component 20 for receiving the pre-captured video image data 10a, radar data and/or the lidar point cloud of the real vehicle environment U1 including a plurality of real objects 12a, 12b, 12c, 12d, 12e which are labeled by applying at least a first machine learning algorithm A1.

Alternatively, the real objects 12a, 12b, 12c, 12d, 12e may, for example, be labeled in advance.

System 2 further includes component 22 for applying at least a first machine learning algorithm A1 to the video image data 10a, the radar data and/or the lidar point cloud to detect and classify the plurality of real objects 12a, 12b, 12c, 12d, 12e.

Furthermore, system 2 includes component 24 for generating a first feature vector M1 representing a respective real object 12a, 12b, 12c, 12d, 12e, which component 24 are adapted to apply a second machine learning algorithm A2 to the respective real object 12a, 12b, 12c, 12d, 12e, and component 26 for storing the first feature vector M1.

System 2 further includes component 28 for providing a plurality of stored second feature vectors M2 representing synthetically generated objects 14a, 14b, 14c, 14d, 14e.

In addition, system 2 includes component 30 for identifying a second feature vector M2 having a greatest degree of similarity MA to the first feature vector M1.

Moreover, system 2 includes component 32 for selecting S6A the identified second feature vector M2 and retrieving a stored synthetic object 14a, 14b, 14c, 14d, 14e that is associated with the second feature vector M2 and corresponds to the real object 12a, 12b, 12c, 12d, 12e, and component 34 for procedurally generating the synthetic object 14a, 14b, 14c, 14d, 14e that corresponds to the real object 12a, 12b, 12c, 12d, 12e.

The component 32 for selecting S6A the identified second feature vector M2 and retrieving a stored synthetic object 14a, 14b, 14c, 14d, 14e which is associated with the second feature vector M2 or the component 34 for procedurally generating the synthetic object 14a, 14b, 14c, 14d, 14e that corresponds to the real object 12a, 12b, 12c, 12d, 12e are used depending on the identified degree of similarity MA.

System 2 also includes component 36 for integrating the synthetic object 14a, 14b, 14c, 14d, 14e into a predetermined virtual vehicle environment U2.

The component 30 for identifying a second feature vector M2 having a greatest degree of similarity MA to the first feature vector M1 are connected both to the component 26 for storing the first feature vector M1 and to the component 28 for providing a plurality of stored second feature vectors M2 representing synthetically generated objects 14a, 14b, 14c, 14d, 14e.

Although specific embodiments of the invention have been illustrated and described herein, it will be appreciated by those of ordinary skill in the art that a variety of alternative and/or equivalent implementations exist. It should be appreciated that the exemplary embodiment or exemplary embodiments are only examples, and are not intended to limit the scope, applicability, or configuration in any way.

Rather, the foregoing summary and detailed description will provide those skilled in the art with a convenient road map for implementing at least one exemplary embodiment, it being understood that various changes may be made in the function and arrangement of elements without departing from the scope as set forth in the appended claims and their legal equivalents.

Generally, this application is intended to cover any adaptations or variations of the specific embodiments discussed herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for creating a virtual vehicle environment for testing automated driving functions of a motor vehicle using pre-captured video image data, radar data and/or a lidar point cloud of a real vehicle environment, the method comprising:
receiving the pre-captured video image data, the radar data and/or the lidar point cloud of the real vehicle environment, wherein the pre-captured video image data, the radar data and/or the lidar point cloud of the real vehicle environment includes a plurality of real objects which are previously labeled or subsequently labeled by applying at least a first machine learning algorithm;
generating a first feature vector representing a respective real object by applying a second machine learning algorithm to the respective real object and storing the first feature vector;
providing a plurality of stored second feature vectors representing synthetically generated objects;
identifying a second feature vector having a greatest degree of similarity to the first feature vector;
selecting the identified second feature vector and retrieving a stored synthetic object that is associated with the second feature vector and that corresponds to the real object or procedurally generating the synthetic object that corresponds to the real object, depending on the degree of similarity of the identified second feature vector to the first feature vector; and
integrating the synthetic object into a predetermined virtual vehicle environment.

2. The computer-implemented method according to claim 1, wherein the labeling of the plurality of real objects is performed by a supervised learning algorithm or by an unsupervised learning algorithm.

3. The computer-implemented method according to claim 1, wherein based on the degree of similarity of the identified second feature vector to the first feature vector being greater than or equal to a predetermined threshold, the identified second feature vector is selected, and the stored synthetic object that is associated with the second feature vector and corresponds to the real object is retrieved.

4. The computer-implemented method according to claim 1, wherein based on the degree of similarity of the identified second feature vector to the first feature vector being less than a predetermined threshold, the synthetic object is procedurally generated.

5. The computer-implemented method according to claim 4, wherein the procedural generation of the synthetic object is performed using the first feature vector generated by the second machine learning algorithm.

6. The computer-implemented method according to claim 1, wherein the second machine learning algorithm for generating the first feature vector is formed by a first variational autoencoder.

7. The computer-implemented method according to claim 1, wherein the second feature vector representing a respective synthetic object is generated by applying a third machine learning algorithm to the respective synthetic object, and wherein the second feature vector is stored in a data store.

8. The computer-implemented method according to claim 1, wherein the real objects contained in the video image data, the radar data and/or the lidar point cloud are classified into main classes by the first machine learning algorithm; and
wherein the real objects assigned to the main classes are further classified into sub-classes by applying a fourth machine learning algorithm.

9. The computer-implemented method according to claim 1, wherein based on the first feature vector and the second feature vector having the same data structure, a direct comparison between the first feature vector and the plurality of second feature vectors is performed to identify the degree of similarity.

10. The computer-implemented method according to claim 1, wherein based on the first feature vector and the second feature vector having different data structures, the degree of similarity of the second feature vector to the first feature vector is identified using a classifier that establishes a correlation between the first feature vector and the second feature vector.

11. The computer-implemented method according to claim 1, wherein a plurality of stored first feature vectors and/or second feature vectors represent 2-D image data, 3-D image data, radar data and/or a lidar point cloud.

12. The computer-implemented method according to claim 1, wherein based on the degree of similarity of the identified second feature vector to the first feature vector being less than a predetermined threshold, a message is generated indicating that the stored plurality of second feature vectors do not have a sufficient degree of similarity to the first feature vector.

13. A system for creating a virtual vehicle environment for testing highly-automated driving functions of a motor vehicle using pre-captured video image data, radar data and/or a lidar point cloud of a real vehicle environment, the system comprising:
at least one non-transitory memory having processor-executable instructions stored thereon; and
at least one processor in communication with the at least one non-transitory memory, wherein the at least one processor is configured to execute the processor-executable instructions to cause the system to perform the following:
receiving the pre-captured video image data, the radar data and/or the lidar point cloud of the real vehicle environment, wherein the pre-captured video image data, the radar data and/or the lidar point cloud of the real vehicle environment includes a plurality of real objects which are previously labeled or subsequently labeled by applying at least a first machine learning algorithm;
applying at least a first machine learning algorithm to the video image data, the radar data and/or the lidar point cloud to detect and classify the plurality of real objects;
generating a first feature vector representing a respective real object,
applying a second machine learning algorithm to the respective real object;
storing the first feature vector;
providing a plurality of stored second feature vectors representing synthetically generated objects;
identifying a second feature vector having a greatest degree of similarity to the first feature vector;
selecting the identified second feature vector and retrieving a stored synthetic object that is associated with the second feature vector and that corresponds to the real object, or procedurally generating the synthetic object that corresponds to the real object, depending on the identified degree of similarity of the identified second feature vector to the first feature vector; and
integrating the synthetic object into a predetermined virtual vehicle environment.

14. A non-transitory computer-readable medium having processor-executable instructions stored thereon for creating a virtual vehicle environment for testing automated driving functions of a motor vehicle using pre-captured video image data, radar data and/or a lidar point cloud of a real vehicle environment, wherein the processor-executable instructions, when executed, facilitate:
receiving the pre-captured video image data, the radar data and/or the lidar point cloud of the real vehicle environment, wherein the pre-captured video image data, the radar data and/or the lidar point cloud of the real vehicle environment includes a plurality of real objects which are previously labeled or subsequently labeled by applying at least a first machine learning algorithm;
generating a first feature vector representing a respective real object by applying a second machine learning algorithm to the respective real object and storing the first feature vector;
providing a plurality of stored second feature vectors representing synthetically generated objects;
identifying a second feature vector having a greatest degree of similarity to the first feature vector;
selecting the identified second feature vector and retrieving a stored synthetic object that is associated with the second feature vector and that corresponds to the real object or procedurally generating the synthetic object that corresponds to the real object, depending on the degree of similarity of the identified second feature vector to the first feature vector; and
integrating the synthetic object into a predetermined virtual vehicle environment.

* * * * *